(12) United States Patent
Artini et al.

(10) Patent No.: US 7,089,091 B2
(45) Date of Patent: Aug. 8, 2006

(54) METHOD AND DEVICE FOR REVISING A FLIGHT PLAN OF AN AIRCRAFT

(75) Inventors: Franck Artini, Toulouse (FR); Edward Strongman, Bretx (FR)

(73) Assignee: Airbus France, Toulouse (FR)

(*) Notice: Subject to any disclaimer, the term of this patent is extended or adjusted under 35 U.S.C. 154(b) by 0 days.

(21) Appl. No.: 11/118,318

(22) Filed: May 2, 2005

(65) Prior Publication Data

US 2005/0261808 A1    Nov. 24, 2005

(30) Foreign Application Priority Data

May 18, 2004    (FR) .................................. 04 05376

(51) Int. Cl.
*G01C 23/00*    (2006.01)

(52) U.S. Cl. .............................. 701/3; 701/14; 701/16; 701/23; 701/26; 701/210; 701/25; 244/175.1

(58) Field of Classification Search .................... 701/3, 701/4, 5, 6, 8, 9, 10, 14, 15, 16, 100, 23–26, 701/200–213; 340/965, 967, 963, 966, 976, 340/974; 244/181, 75.1

See application file for complete search history.

(56) References Cited

U.S. PATENT DOCUMENTS

| 5,922,031 | A | 7/1999 | Larrieu | |
|---|---|---|---|---|
| 6,020,832 | A * | 2/2000 | Jensen | 340/970 |
| 6,021,374 | A * | 2/2000 | Wood | 701/301 |
| 6,181,987 | B1 | 1/2001 | Deker et al. | |
| 6,643,580 | B1 | 11/2003 | Naimer et al. | |
| 6,816,780 | B1 * | 11/2004 | Naimer et al. | 701/206 |

FOREIGN PATENT DOCUMENTS

EP         0707194         4/1996

* cited by examiner

*Primary Examiner*—Richard M. Camby
(74) *Attorney, Agent, or Firm*—Stevens, Davis, Miller & Mosher, LLP

(57) ABSTRACT

A flight plan revision device may include a first component that determines an auxiliary flight plan corresponding to a lateral revision of the current flight plan, at least over a low altitude flight section. A second component automatically determines at least one decision point indicating the last position of the aircraft along the current flight plan where the auxiliary flight plan can still be activated, so as to allow the aircraft to overfly the terrain in complete safety by following the auxiliary flight plan under the same flight conditions as those envisaged for the current flight plan. A third component automatically presents at least the decision point to a pilot of the aircraft. And a fourth actuatable component allows a pilot to activate the auxiliary flight plan, so as to carry out the lateral revision of the current flight plan.

16 Claims, 4 Drawing Sheets ation time) the auxiliary flight plan (namely computation time allocated to determining this auxiliary flight plan).

METHOD AND DEVICE FOR REVISING A FLIGHT PLAN OF AN AIRCRAFT

FIELD OF THE INVENTION

The present invention relates to a revision method and device for carrying out a lateral revision of a flight plan of an aircraft, as well as an automatic guidance system comprising such a revision device.

BACKGROUND OF THE RELATED ART

It is known that a flight plan generally comprises waypoints that the aircraft must overfly, information (altitude, speed, etc.) pertaining to these waypoints, as well as information relating to legs between the various waypoints. Such a flight plan makes it possible to construct a flight trajectory comprising said legs, generally rectilinear, which join up laterally with said waypoints. Said flight trajectory comprises a lateral trajectory defined in the horizontal plane and a vertical trajectory (flight profile) defined in the vertical plane.

It is known moreover that the revision of a flight plan can consist in deleting or adding waypoints, in modifying the position of waypoints or of characteristics (time, speed, altitude) pertaining to these waypoints or to said legs.

SUMMARY OF THE INVENTION

Although not exclusively, the present invention applies more particularly to the revision of a current flight plan (that is to say of a flight plan which is followed currently by the aircraft), when the aircraft is flying at least over a section of flight trajectory (in accordance with this flight plan) which is a low altitude flight trajectory. Such a low altitude flight trajectory allows the aircraft to follow as closely as possible the terrain overflown, in particular so as to avoid being pinpointed. The corresponding low altitude flight trajectory (or section of flight trajectory) is therefore situated at a predetermined height from the terrain, for example 500 feet (around 150 meters).

If the pilot revises the flight plan of the aircraft, during a flight along such a low altitude flight trajectory section, it may happen, after the revision of said flight plan, when the aircraft is flying along the new flight plan, that said aircraft is situated below the new flight trajectory, on account of an induced modification of the terrain profile used to determine this new flight trajectory (and because the maximum climb slopes that the aircraft can follow may be less than the slopes of the terrain to be overflown), and is no longer capable of joining up with the latter trajectory or of overflying the highest peaks situated under the new flight plan. Naturally, such a risk is not permissible.

Also, when during a flight along such a low altitude flight trajectory section, the pilot wants to carry out a revision of the flight plan, he is obliged:

to make the aircraft climb to a safety altitude, before carrying out this revision, so as to avoid any risk of collision of the aircraft with the surrounding terrain;

to subsequently carry out the revision at this safety altitude;

then, when the revision is carried out, to make the aircraft descend again so that it follows the new flight plan which is then activated (that is to say used for the guidance of the aircraft and the computation of predictions in particular).

Such a procedure is therefore very complex, and moreover requires that the aircraft be made to fly at a higher safety altitude and thus in particular makes it necessary to dispense with the terrain masking throughout the whole of the revision of said flight plan.

The present invention relates to a method of revision for carrying out a lateral revision of a current flight plan of an aircraft, which makes it possible to remedy the aforesaid drawbacks.

For this purpose, according to the invention, said method is noteworthy in that:

a) an auxiliary flight plan corresponding to a lateral revision of said current flight plan at least over a low altitude flight section is determined;

b) at least one decision point which indicates the last position of the aircraft along said current flight plan, where said auxiliary flight plan can still be activated, is determined automatically so as to allow the aircraft to overfly the terrain in complete safety by following said auxiliary flight plan, under the same flight conditions (and conditions for computing at least the low altitude flight section) as those envisaged for said current flight plan;

c) at least said decision point is presented automatically to a pilot of the aircraft; and d) the pilot can, at least as a function of this presentation, activate said auxiliary flight plan so as to carry out the lateral revision of the current flight plan.

Thus, by virtue of the invention, the aircraft can continue to fly at low altitude during the revision of the flight plan. Specifically, as long as the aircraft has not reached said decision point, the pilot knows that he can activate a new flight plan (namely said auxiliary flight plan) in complete safety. This makes it possible to remedy the aforesaid drawbacks.

Furthermore, the present invention applies to all types of flight plans (and to all types of flight trajectories).

Preferably, the flight conditions taken into account in step b) comprise at least:

the maximum continuous thrust;

a speed preset; and a condition relating to the fault of an engine of the aircraft.

In a first embodiment, in step a), an auxiliary flight plan is determined by carrying out at least one of the following operations on said current flight plan:

at least one waypoint is shifted;

at least one waypoint is inserted;

at least one waypoint is deleted; and an exclusive waypoint toward which the aircraft must direct itself directly is inserted.

Furthermore, advantageously:

in step b), a transition point which indicates the downstream position closest to the aircraft on said current flight plan, with respect to the actual position of the aircraft, on the basis of which a lateral revision of said current flight plan may be taken into account, is moreover automatically determined; and in step c), said transition point is moreover presented automatically to a pilot of the aircraft.

Advantageously, said transition point is determined on the basis:

of the actual position of the aircraft;

of the actual speed of the aircraft;

of said current flight plan; and of a predetermined duration of computation.

Preferably, said predetermined duration of computation corresponds to a maximum duration for determining (computing) an auxiliary flight plan. It therefore depends on the computational performance of the trajectory computer used.

Additionally, in a second embodiment, said auxiliary flight plan comprises at least one optional route.

The present invention also relates to a device for carrying out a lateral revision of a current flight plan (of an aircraft), comprising at least waypoints that the aircraft must overfly.

According to the invention, said device is noteworthy in that it comprises:
- first means for determining an auxiliary flight plan corresponding to a lateral revision of said current flight plan at least over a low altitude flight section;
- second means for automatically determining at least one decision point which indicates the last position of the aircraft along said current flight plan, where said auxiliary flight plan can still be activated, so as to allow the aircraft to overfly the terrain in complete safety by following said auxiliary flight plan, under the same flight conditions as those envisaged for said current flight plan;
- third means for automatically presenting at least said decision point to a pilot of the aircraft; and
- fourth actuatable means, allowing a pilot to activate said auxiliary flight plan, so as to carry out the lateral revision of the current flight plan.

Advantageously, said first means comprise:
- data input means and computation means allowing an operator to modify waypoints of said current flight plan; and/or
- means for determining an optional route.

Furthermore, according to the invention, said third means may comprise a head-up display screen and/or a head-down display screen.

The present invention also relates to an automatic guidance system for an aircraft, of the type comprising:
- a set of information sources;
- an auxiliary source of information able to provide a current flight plan;
- a central unit for automatically determining orders for steering the aircraft, with the aid of information received from said set of information sources and a current flight plan provided by said auxiliary source of information; and
- means of actuation of controlled members of the aircraft, to which the steering orders determined by said central unit are applied automatically.

According to the invention, said automatic guidance system is noteworthy in that said auxiliary source of information comprises a device of the above mentioned type, for carrying out a lateral revision of a current flight plan of the aircraft.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
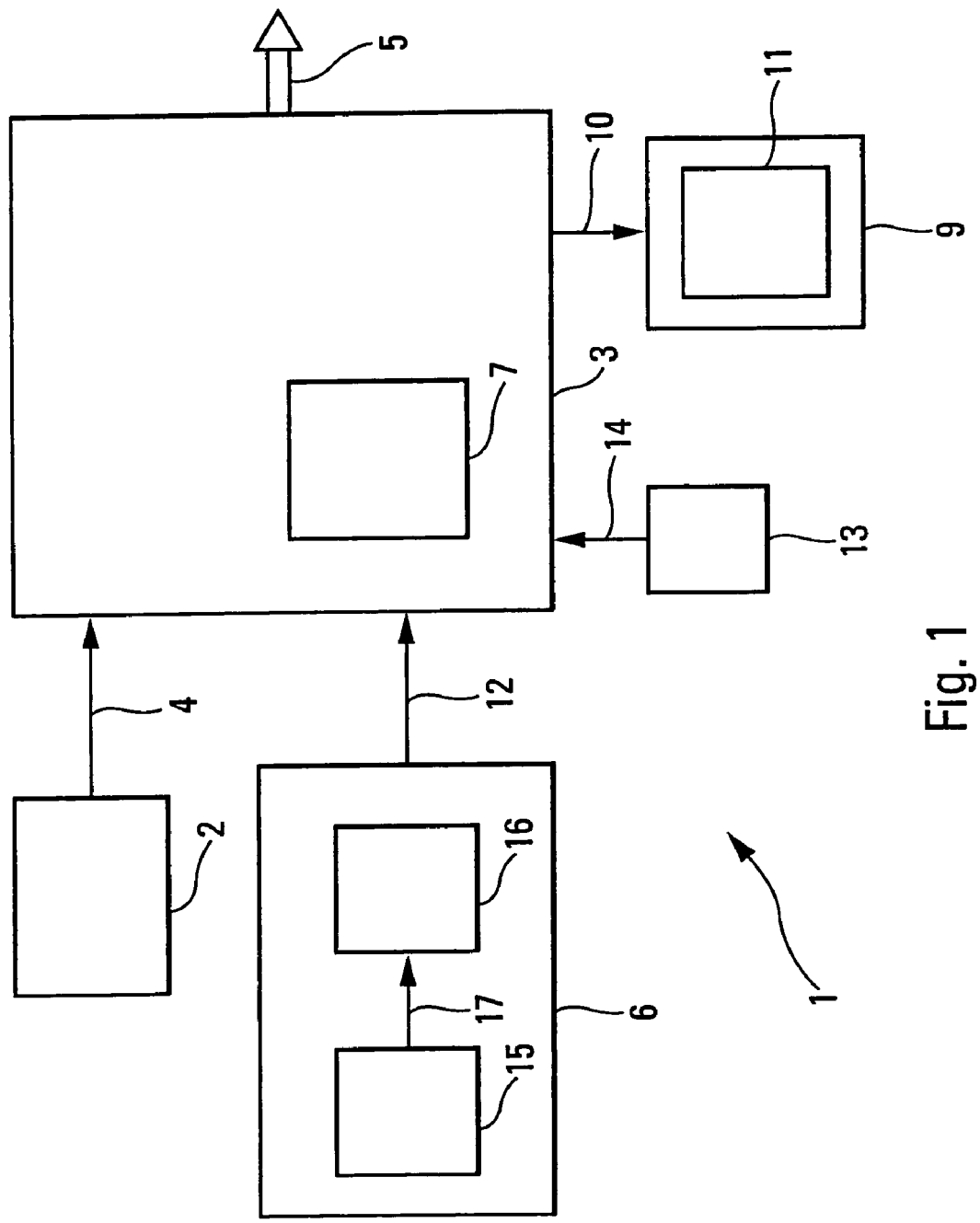
FIG. 1 is the schematic diagram of a device in accordance with the invention.

The device 1 in accordance with the invention and represented diagrammatically in FIG. 1 is intended to carry out a lateral revision of a current flight plan PV0 of an aircraft A.

To do this, said device 1 which is carried on board the aircraft A, in particular a military transport plane, comprises in standard fashion:
- a set 2 of standard information sources; and
- a central unit 3 for determining a flight plan PV, in particular with the aid of information received by way of a link 4 from said set 2 of information sources, and for transmitting this flight plan PV to user devices specified hereinbelow, by way of a link 5.

Such a flight plan PV generally comprises at least:
- waypoints P1, namely predefined geographical navigation points, that the aircraft A must overfly and that are stored in a navigation database or defined explicitly by an operator, in particular a pilot of the aircraft A;
- information (altitude, speed, etc.) pertaining to these waypoints P1; and
- information relating to legs S1 between these waypoints P1.

Figure 2:
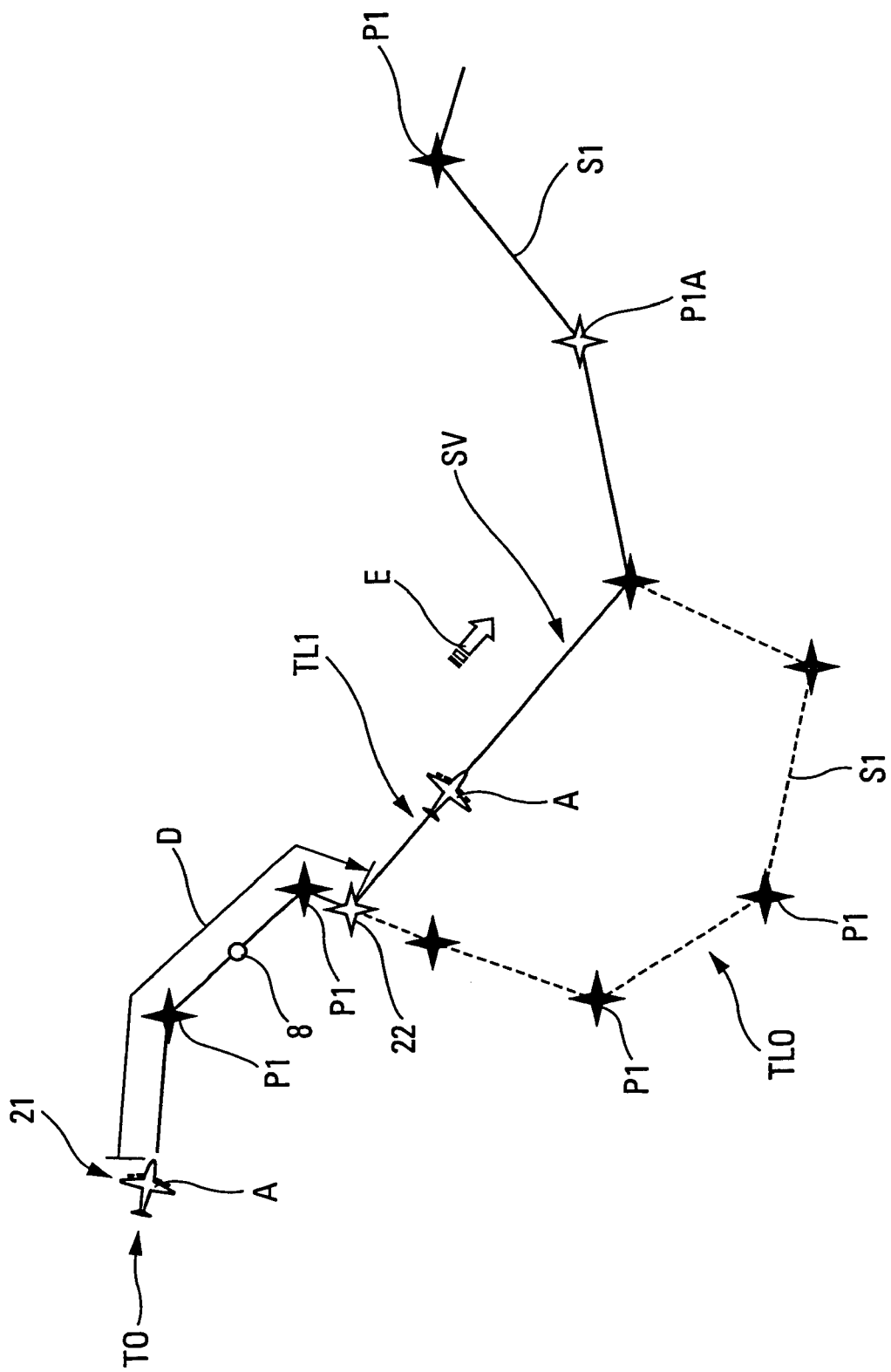
FIGS. 2 and 3 are two graphics illustrating flight trajectories, respectively in the horizontal plane and in the vertical plane, allowing a full understanding of the present invention.
Figure 3:
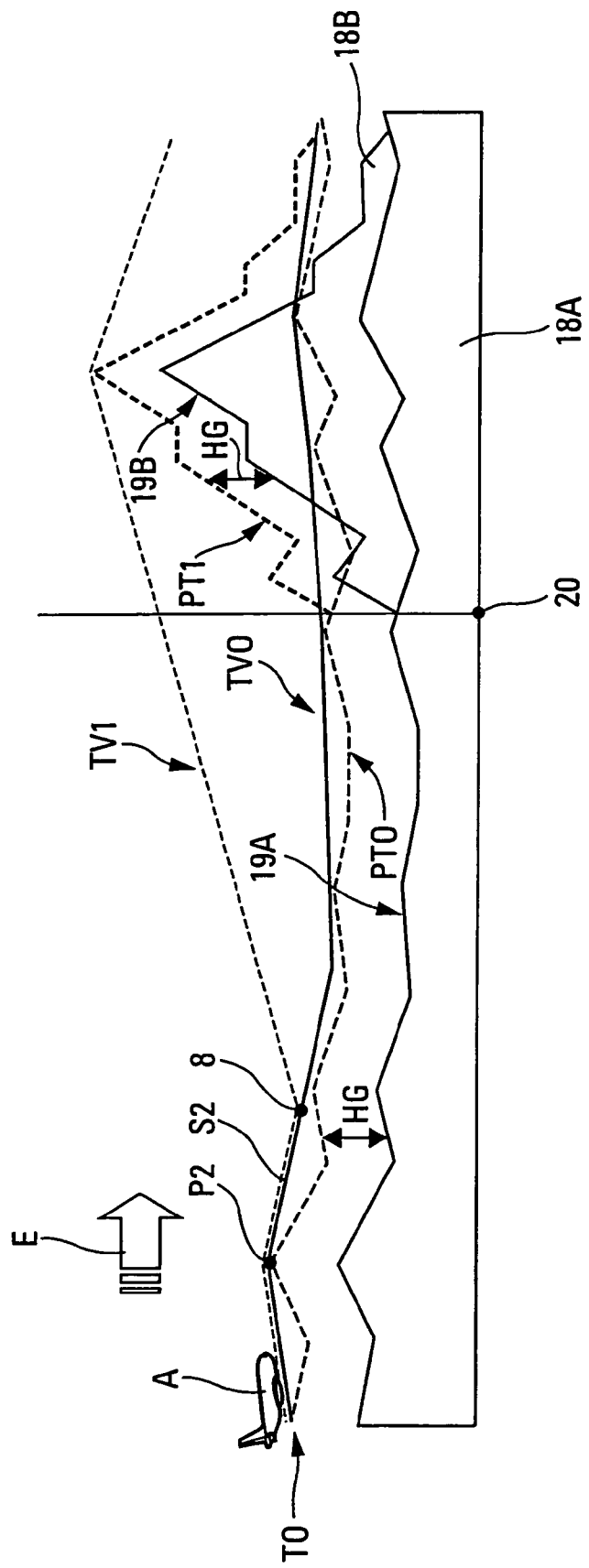

Such a flight plan PV makes it possible to construct a flight trajectory TO comprising:
- a lateral trajectory TL defined in the horizontal plane and comprising said rectilinear legs S1 which join up with said waypoints P1, as represented in FIG. 2; and
- a vertical trajectory TV (or flight profile) defined in the vertical plane and also comprising rectilinear segments S2 which join up with points P2, as represented in FIG. 3.

It is considered that the aircraft A is guided along a current flight plan PV0 with a current lateral trajectory TL0 and a current vertical trajectory TV0, for example under IMC conditions (IMC standing for "instrument meteorological conditions"), that is to say under instrument flight meteorological conditions.

According to the invention, said device 1 moreover comprises:
- means 6 for determining an auxiliary flight plan PV1 corresponding to a lateral revision of said current flight plan PV0, at least over a low altitude flight section SV (which goes as far as a waypoint P1A represented in FIG. 2);
- means 7 which are, preferably, integrated within the central unit 3, for automatically determining at least one decision point 8 which indicates the last position of the aircraft A along said current flight plan PV0, where said auxiliary flight plan PV1 can still be activated, so as to allow the aircraft A to overfly the terrain in complete safety by following said auxiliary flight plan PV1, under the same flight conditions as those envisaged during the computation of said current flight plan PV0. These flight conditions comprise at least:
  - the maximum continuous thrust of the aircraft A;
  - a speed preset for the aircraft A; and
  - a condition pertaining to a fault of an engine of the aircraft A;
- display means 9 which are connected by a link 10 to said central unit 3, for automatically presenting on a display screen 11 at least said decision point 8 to a pilot of the aircraft A; and
- standard means of actuation 13 which are connected by a link 14 to the central unit 3 and which allow a pilot to activate said auxiliary flight plan PV1, so as to carry out the lateral revision of the current flight plant PV0. Through such activation, the flight plan is updated and the auxiliary flight plan PV1 is that which becomes active and which is therefore taken into account, in particular, for the guidance of the aircraft A, as specified hereinbelow, and/or for the computation of predictions (transit time, fuel available, speed, etc.).

Within the framework of the present invention, said auxiliary flight plan PV1 can comprise:

- in a first variant, a lateral revision of the current flight plan PV0, consisting in carrying out at least one of the following operations:
  - shifting at least one waypoint P1;
  - inserting at least one waypoint P1;
  - deleting at least one waypoint P1; and
  - inserting an exclusive waypoint P1, toward which the aircraft A must direct itself directly, according to a standard procedure of "DIRECT TO" type.

To do this, said means 6 which are connected by a link 12 to the central unit 3, comprise means 15 for inputting data and computation means 16, which are connected together by a link 17 and which allow an operator to modify the waypoints P1 of the current flight plan PV0, by carrying out the above operations; and

- in a second variant, an optional route which can be determined in standard fashion by said means 6, with the aid of standard means (for example said means 15 and 16) which are integrated within said means 6.

Furthermore, according to the invention, said display screen 11 is a head-down screen, for example a standard navigation screen, or a head-up screen, for example of HUD ("head up display") type. Said display screen 11 can be a vertical screen or a horizontal screen.

The present invention applies more particularly to a flight at low altitude, at least along a section SV. Generally, a low altitude flight trajectory is determined so as to lie above a terrain profile which is situated (at a predetermined guard height HG) above the relief of the terrain overflown, so as to avoid any collision with this terrain. This is represented in FIG. 3 for the current vertical trajectory TV0, corresponding to the current flight plan PV0, which is therefore determined on the basis of a terrain profile PT0 which depends on the relief 19A of the terrain 18A beneath the lateral trajectory TL0 defined by this current flight plan PV0. The vertical trajectory TV0 is represented as a continuous line and the terrain 18A under this vertical trajectory TV0 is represented in light grey.

When the flight plan is revised, and hence when the current flight plan PV0 is modified, by replacing it for example with said auxiliary flight plan PV1, the lateral trajectory TL1 is modified and thus so also is the terrain profile PT1 situated below the relief 19B of the new terrain 18B overflown (represented in darker grey in FIG. 3). Also, when the lateral revision is carried out at a point 20 represented in FIG. 3, the aircraft A may no longer be capable of joining up with the new vertical trajectory TV1 (represented in broken lines in FIG. 3) or of overflying the highest peaks (profile 19B) situated under the new lateral trajectory TL1, in a standard situation.

The device 1 in accordance with the invention makes it possible to remedy this drawback, by presenting the pilot with the decision point 8 which indicates the last position of the aircraft A along the current flight plan PV0 (vertical trajectory TV0), where the auxiliary flight plan PV1 can still be activated, so as to allow the aircraft A to overfly the terrain 18B in complete safety by following said auxiliary flight plan PV1 (virtual trajectory TV1), and to do so under the same flight conditions (for example thrust and speed presets, and a condition pertaining to a fault of an engine of the aircraft A) as those envisaged initially for said flight plan PV0.

It will be noted that if the auxiliary flight plan PV1 is activated, the aircraft A follows the vertical trajectory TV1 onward of the decision point 8 (where it therefore exits the vertical trajectory TV0). However, up to the point 20, the lateral trajectory is unchanged. The aircraft A does not branch laterally onto the new lateral trajectory TL1 until after said point 20 (FIG. 3).

Furthermore, in FIG. 2 are represented:

- in a continuous line, the lateral trajectory actually followed by the aircraft A, taking into account (after a point 22 specified hereinbelow) the new lateral trajectory TL1 pertaining to the activated auxiliary flight plan PV1; and
- in broken lines, the lateral trajectory part initially forming part of the lateral trajectory TL0 pertaining to the flight plan PV0, but not taken into account in said activated auxiliary flight plan PV1.

Naturally, within the framework of the present invention, when the revision of the flight plan relates to the consideration of an optional route (which is activatable by a pilot of the aircraft A with the aid of the means 13), said decision point 8 is also presented to the pilot, and therefore represents the last point on the current flight plan PV0, where the activation of this optional route may be carried out in complete safety.

Additionally, the central unit 3 determines, moreover, automatically a transition point 22 which indicates the downstream (in the direction of flight E) position closest to the aircraft A on said current flight plan PV0, with respect to the actual position 21 of the aircraft A, on the basis of which a lateral revision of said current flight plan PV0 may be taken into account, if this lateral revision is made at said actual position 21. Said means 9 automatically present said transition point 22 to a pilot of the aircraft A. Said transition point 22 lies (horizontally) at a distance D (depending on the recomputation time) from the actual position 21 of the aircraft A, as represented in FIG. 2.

The central unit 3 determines said transition point 22, on the basis of information received in particular from said set 2 of information sources and especially on the basis of:

- the actual position 21 of the aircraft A;
- the actual speed of the aircraft A;
- the current flight plan PV0; and
- a predetermined duration of computation.

This predetermined duration of computation corresponds to the maximum duration for allowing the means 16 to determine the auxiliary flight plan PV1, that is to say to compute the corresponding flight trajectory (TV1 and TL1), for the most difficult possible conditions of computation (with in particular a rugged terrain profile PT1). This makes it possible to remedy the fact that an auxiliary flight plan PV1 is not directly available and therefore cannot be followed directly by the aircraft A, when a pilot carries out a lateral revision.

Figure 4:
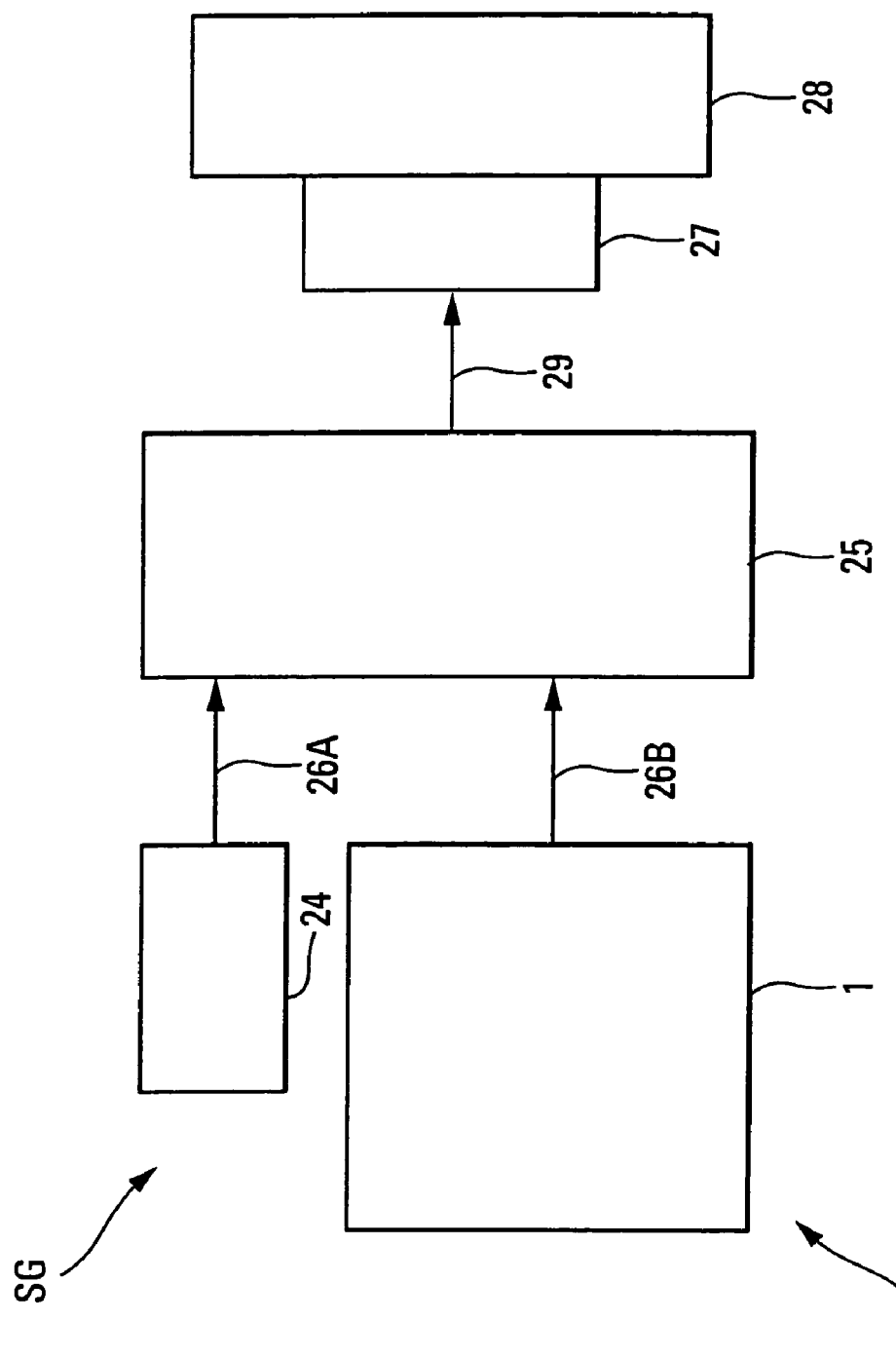
FIG. 4 is the schematic diagram of a guidance system in accordance with the invention.

In a preferred embodiment, said device 1 in accordance with the invention forms part of an automatic guidance system SG represented diagrammatically in FIG. 4.

Said automatic guidance system SG comprises in standard fashion:

- a set 24 of information sources;
- an auxiliary source of information 23 able to provide a current flight plan PV0;

a central unit 25 which is connected by a link 26A to said set 24 and by a link 26B to said auxiliary source of information 23, for automatically determining orders for steering the aircraft A, with the aid of information received from said set 2 of information sources and a current flight plan PV0 provided by said auxiliary source of information 23; and means of actuation 27 of controlled members 28 (control surfaces, etc.) of the aircraft A, to which the steering orders determined by said central unit 25 are applied automatically via a link 29.

According to the invention, said auxiliary source of information 23 comprises the aforesaid device 1 in accordance with the invention, for carrying out a lateral revision of a current flight plan PV0 of the aircraft A, said link 26B possibly comprising (or corresponding to) the link 5 of FIG. 1.

It will be noted that said auxiliary source of information 23 (more precisely for example the central unit 3 of this source 23) determines the flight trajectory corresponding to a current flight plan (revised or otherwise) with the aid of predicted climb and descent performance. Moreover, it determines this flight trajectory TO in such a way that it hugs as closely as possible the configuration of the relief 19A, 19B of the terrain 18A, 18B overflown, over the low altitude flight section SV. Moreover, generally, said flight trajectory TO is determined by taking into account the fact that an engine is faulty (in such a way as to allow the aircraft A to continue to fly along said flight trajectory TO after a fault of an engine), the maximum continuous thrust and the speed preset.

The invention claimed is:

1. A method of revision for carrying out a lateral revision of a current flight plan of an aircraft, comprising at least waypoints that the aircraft must overfly, said aircraft flying along a low altitude flight trajectory allowing said aircraft to follow as closely as possible the terrain overflown, in which method:
   a) determining an auxiliary flight plan corresponding to a lateral revision of said current flight plan over a low altitude flight section, said lateral revision entailing the taking into account of a new terrain to be overflown;
   b) determining automatically at least one decision point which indicates the last position of the aircraft along said current flight plan, where said auxiliary flight plan can still be activated, so as to allow the aircraft to overfly said new terrain in complete safety by following said auxiliary flight plan, and to do so under the same flight conditions as those envisaged for said current flight plan;
   c) presenting automatically at least said decision point to a pilot of the aircraft wherein the pilot can, at least as a function of this presentation, activate said auxiliary flight plan so as to carry out the lateral revision of the current flight plan.

2. The method as claimed in claim 1, wherein the flight conditions taken into account in step b) comprise at least:
   the maximum continuous thrust;
   a speed preset; and
   a condition relating to the fault of an engine of the aircraft.

3. The method as claimed in claim 1, wherein in step a), an auxiliary flight plan is determined by carrying out at least one of the following operations on said current flight plan:
   at least one waypoint is shifted;
   at least one waypoint is inserted;
   at least one waypoint is deleted; and
   an exclusive waypoint toward which the aircraft must direct itself directly is inserted.

4. The method as claimed in claim 1, wherein:
   in step b), a transition point which indicates the downstream position closest to the aircraft on said current flight plan, with respect to the actual position of the aircraft, on the basis of which a lateral revision of said current flight plan may be taken into account, is moreover automatically determined; and
   in step c), said transition point is moreover presented automatically to a pilot of the aircraft.

5. The method as claimed in claim 4, wherein said transition point is determined on the basis:
   of the actual position of the aircraft;
   of the actual speed of the aircraft;
   of said current flight plan; and
   of a predetermined duration of computation.

6. The method as claimed in claim 5, wherein said predetermined duration of computation corresponds to a maximum duration for determining an auxiliary flight plan.

7. The method as claimed in claim 1, wherein said auxiliary flight plan comprises at least one optional route.

8. A device for carrying out a lateral revision of a current flight plan of an aircraft, comprising at least waypoints that the aircraft must overfly, said aircraft flying along a low altitude flight trajectory allowing said aircraft to follow as closely as possible the terrain overflown, said device comprising:
   a first section that determines an auxiliary flight plan corresponding to a lateral revision of said current flight plan over a low altitude flight section, said lateral revision entailing the taking into account of a new terrain to be overflown;
   a second section that automatically determines at least one decision point which indicates the last position of the aircraft along said current flight plan, where said auxiliary flight plan can still be activated, so as to allow the aircraft to overfly said new terrain in complete safety by following said auxiliary flight plan, and to do so under the same flight conditions as those envisaged for said current flight plan;
   a third section that automatically presents at least said decision point to a pilot of the aircraft; and
   a fourth actuatable section that allows a pilot to activate said auxiliary flight plan, so as to carry out the lateral revision of the current flight plan.

9. The device as claimed in claim 8, wherein said first section comprises a data input section and a computation section that allows an operator to modify waypoints of said current flight plan.

10. The device as claimed in claim 8, wherein said first section includes a section that determines an optional route.

11. The device as claimed in claim 8, wherein said third section comprises a head-up display screen.

12. The device as claimed in claim 8, wherein said third section comprises a head-down display screen.

13. An automatic guidance system for an aircraft, said guidance system comprising:
   a set of information sources;
   an auxiliary source of information operable to provide a current flight plan;
   a central unit that automatically determines orders for steering the aircraft, with the aid of information received from said set of information sources and a current flight plan provided by said auxiliary source of information; and
   a section that actuates controlled members of the aircraft, to which the steering orders determined by said central unit are applied automatically, wherein:
   said auxiliary source of information comprises a device such as that specified under claim 8, that carries out a lateral revision of a current flight plan of the aircraft.

14. An aircraft, which comprises a guidance system such as that specified under claim 13.

15. An aircraft, which comprises a device such as that specified under claim 8.

16. An aircraft, which comprises a device capable of implementing the method specified under claim 1.

* * * * *